Sept. 13, 1938.   P. J. PARK   2,129,781
DECOY APPARATUS
Filed Jan. 29, 1938   4 Sheets-Sheet 1

Inventor
P. J. Park
By Clarence A. O'Brien
Hyman Berman
Attorneys

Sept. 13, 1938.  P. J. PARK  2,129,781
DECOY APPARATUS
Filed Jan. 29, 1938  4 Sheets-Sheet 3

Inventor
P. J. Park
By Clarence A. O'Brien
Hyman Berman
Attorneys

Sept. 13, 1938.　　　　　P. J. PARK　　　　　2,129,781

DECOY APPARATUS

Filed Jan. 29, 1938　　　　4 Sheets-Sheet 4

Inventor

P. J. Park

By Clarence A. O'Brien

Hyman Berman

Attorneys

Patented Sept. 13, 1938

2,129,781

UNITED STATES PATENT OFFICE 2,129,781

DECOY APPARATUS

Peter Jay Park, Rushville, Ill.

Application January 29, 1938, Serial No. 187,743

6 Claims. (Cl. 43—3)

This invention appertains to new and useful improvements in decoy apparatus.

The principal object of the present invention is to provide a decoy apparatus wherein the decoys are actuated to simulate various motions of a live bird.

Another important object of the invention is to provide a decoy apparatus which will simulate flying and descending motions of fowls.

Still another important object of the invention is to provide a decoy apparatus wherein dead ducks or other birds can be positioned and motivated in a manner to simulate actions of live birds of like kind, so as to decoy live birds within range of the gunner.

Other important objects and advantages of the invention will become apparent to the reader of the following specification.

In the drawings:—

Figure 4 is a fragmentary side elevational view of the neck portion of the harness.

Figure 6 is a perspective view of the neck lifting member of the harness.

Figure 8 is a diagrammatic view showing a decoy with the release string ready to be released and which is used when a plurality of decoys are used on the same line.

Figure 9 is a fragmentary perspective view showing the slip-knot for the release cord shown in Figure 8.

Figure 5:
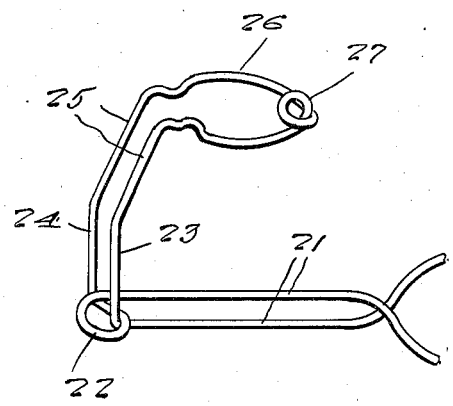
Figure 5 is a fragmentary perspective view of the neck portion of the harness.
Figure 7:
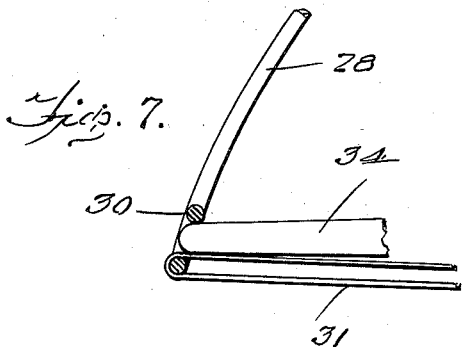
Figure 7 is a fragmentary detailed sectional view showing one of the wing members of the harness.

Referring to the drawings wherein like numerals designate like parts, it can be seen, that the harness is generally referred to by numeral 5 and consists of the elongated structure made up of a single strip of wire or like material A. This elongated structure has its end portions 6—6 in abutting relation at which end portions the wire is formed into the eye 7. The side portions of this elongated wire member are flared forwardly as at 8, twisted into eyes 9—9 and then disposed inwardly as at 10 and crossed and secured together as at 11. The wire member is then flared outwardly to form the loop 12 and the lateral eye members 13—13. Forwardly of the loop 12 the wire crosses again as at 14 and is formed into the large loop 15 adjacent the forward end of which the loop is formed into the eyes 16—16 and then crossed and secured together as at 17 before being formed into the ring 18 and also the eyes 19—19. The wire is then crossed as at 20 and extended forwardly in a pair of leg portions 21—21. (See Figure 5.) At the forward end of these portions 21—21, one leg 21 is bent laterally as at 22 to form a loop through which rises a portion 23 of the other leg. The upstanding portions 23—24 rise and incline backwardly as at 25 in spaced relation to each other to terminate in the substantially horizontal loop 26 at the rear extremity of which is formed the eye 27.

A pair of wing members 28—28 of wire and of narrow looped formation each has its free end provided with an eye 29 for embracing a side portion of the loop 15 while its outer end portion is formed with an eye 30. These eyes 30—30 are connected by the rubber band 31 for bringing the wings together closely under the fowl along with the wings 32 of the fowl 33 when the stick 34 is knocked from between the wing members 28 when the stick strikes against a stake 35 driven in the bottom of a river or other body of water.

Figure 1:
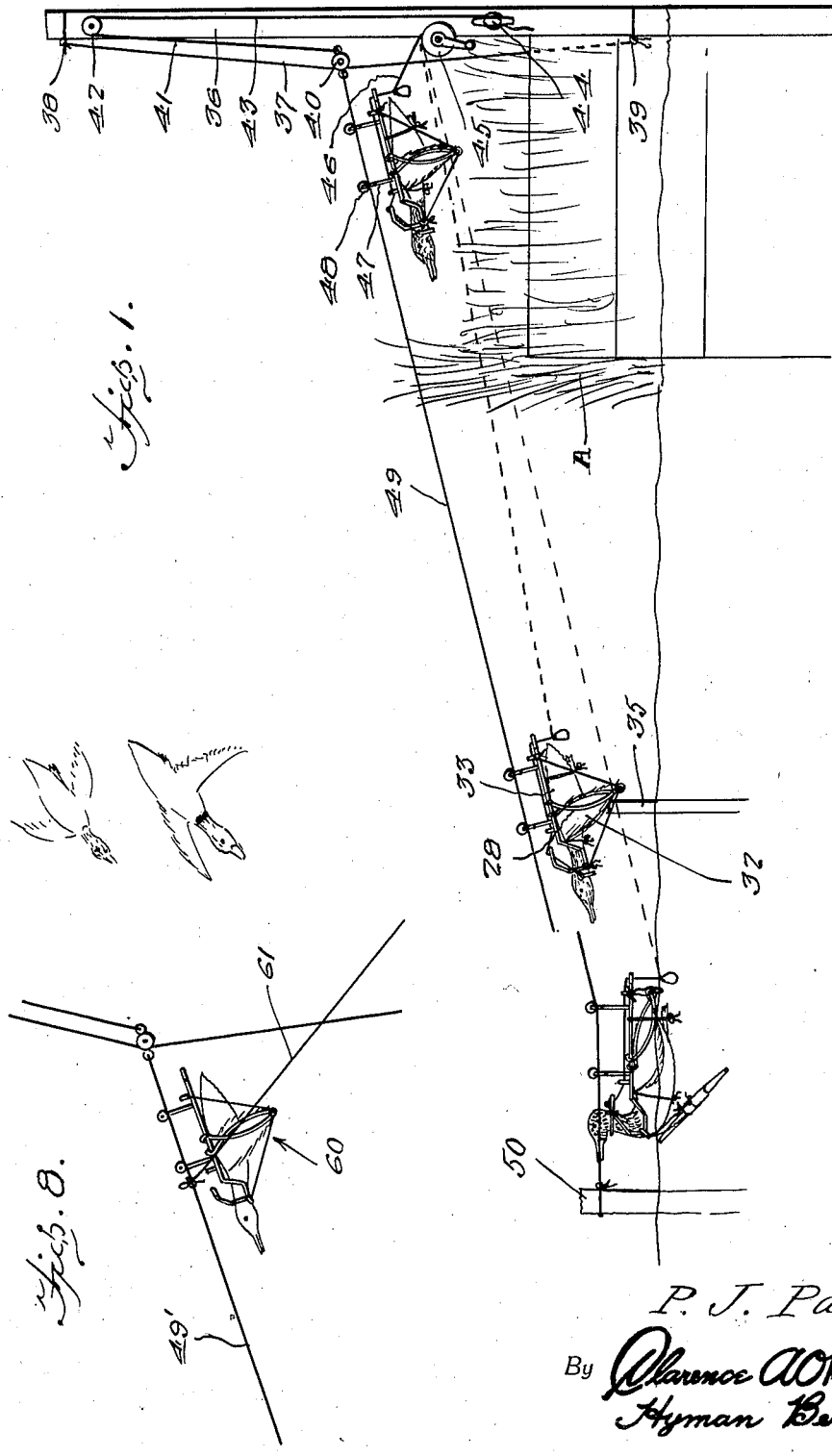
Figure 1 represents a side elevational view of the apparatus showing a decoy in different positions of travel from its point of dispatch to its destination.

Referring to Figure 1, it can be seen that numeral 36 denotes a post adjacent the blind A which is provided with a vertically extending cord 37 having its upper end attached as at 38 to the upper end of the post 36 and its lower end as at 39 to the lower portion of the post, and along this is ridable the pulley 40 which has the line 41 attached thereto and extending upwardly over the pulley 42 and downwardly as at 43 to the cleat 44 on the post 36.

Figure 2:
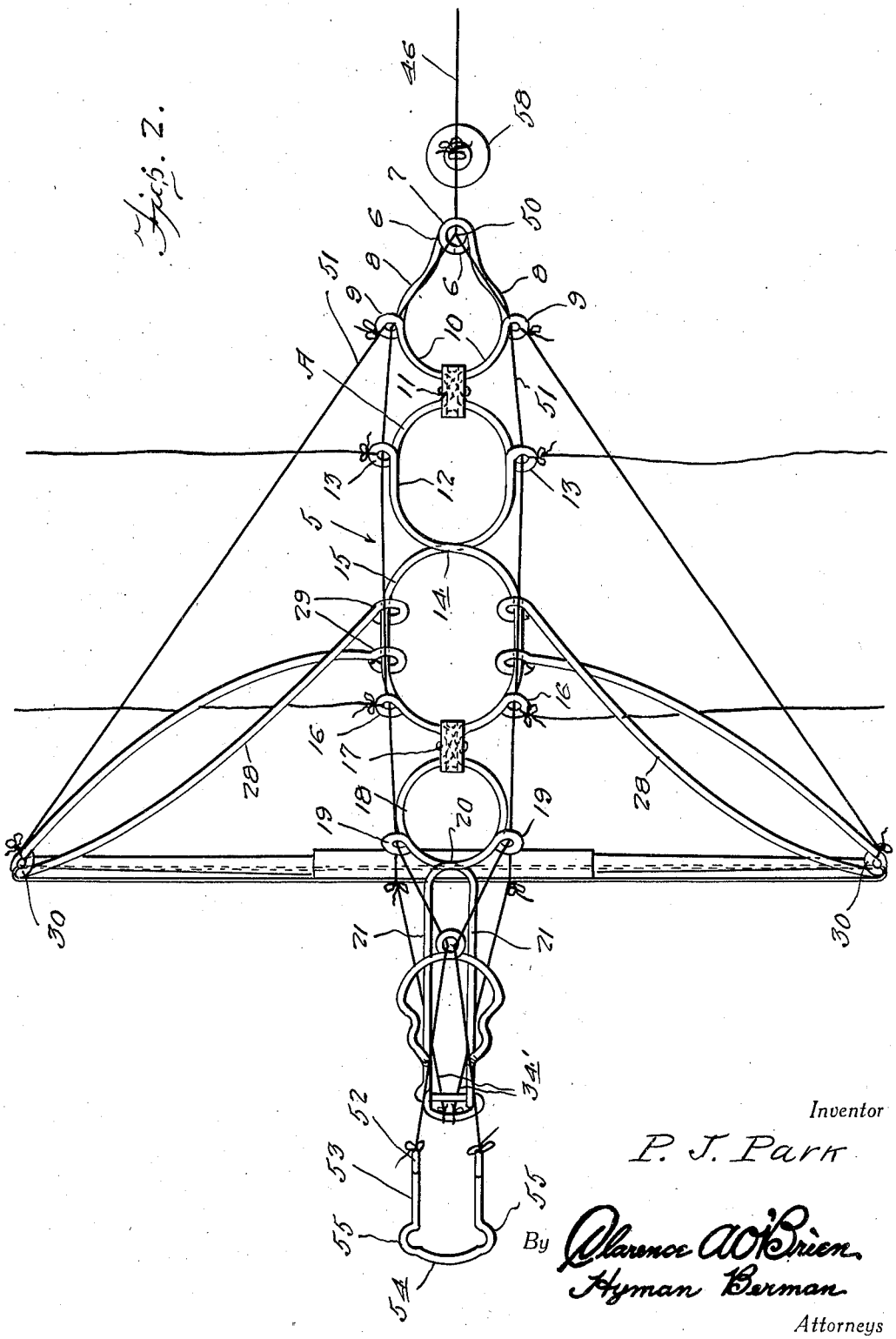
Figure 2 is a top plan view of the harness.
Figure 3:
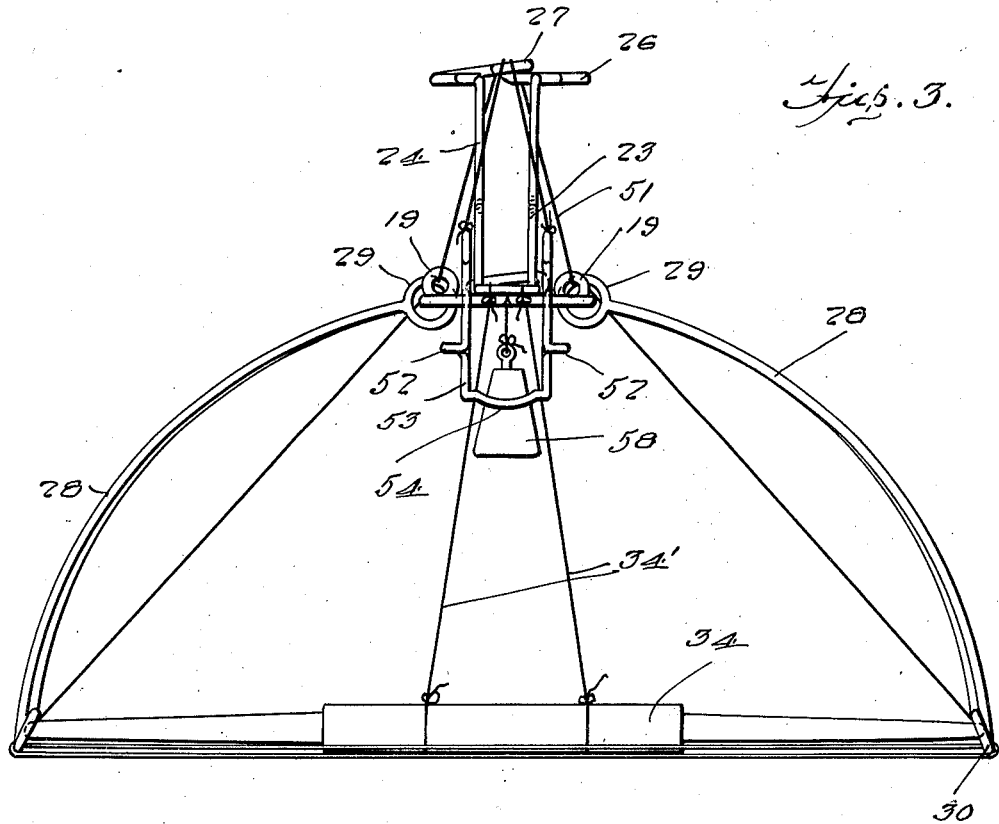
Figure 3 is a front elevational view of the harness.

A reel 45 is provided on the post 36 and over which is wound the line 46, this line extending to the harness 5 as suggested in Figure 2.

The harness 5 is provided with upstanding members 47 having grooved rollers 48 at their upper ends for riding engagement with the line 49, which line extends from the stake 50 to the pulley 40.

The line 46 extends to the point 50 where it passes through the eye 7 of the harness and separates into the two lines 51—51 which pass through the eyes 9, 13, 16 and 19 to the eye 27 and from thence to the end portions 52—52 of the U-shaped neck riser 53, the bight portion 54 of which is provided with laterally disposed ears 55—55 and the offset intermediate portions 56 in the leg portions thereof. This U-shaped structure normally supports the neck of the dead fowl 32 in lowered position as shown in Figure 1, in which position the fowl normally carries its neck while flying.

The fowl is released at the upper portion of the line 49 and rides down the line with the line 46 serving to control the fowl and acting as means whereby the decoy can be retrieved.

When only one decoy is being used, the stake 35 is being dispensed. In this connection, a pull back on the line 46 to which the lines 2—2 are connected will dislodge the prop 34. The strings 3—3 which are permanently tied to the harness are wound several times around the prop as suggested in Figure 4. Obviously, when a pull on the line 46 is made, the prop and wing members move rearwardly until all slack in the lines 3—3 is taken up.

Suitable weight members 58—59 can be employed in conjunction with the decoy for properly setting the same.

As shown in Figure 8, where a plurality of decoys are used on the line 49' the line 46 is employed only with the first of the descending decoys after which the remaining decoys 60 are released by the cord 61, which cord is connected to the line 49' by a slip-knot 62. Obviously by pulling the release cord 61, the decoy 60 can be released and thus one decoy after another can be released to move downwardly to a point adjacent the first decoy and obviously by retrieving the first decoy all of the subsequent decoys 60 can be pulled backwardly on the line 49'.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:—

1. A decoy apparatus comprising an inclined line, a dead bird carrier movable on the line and remote control means for controlling the position of the dead bird's head and neck in the carrier.

2. A decoy apparatus comprising an inclined line, a dead bird carrier movable on the line and remote control means for controlling the position of the dead bird's head and neck in the carrier, said carrier consisting of an elongated framework constructed of a single strip of material, said frame being formed to provide laterally extending eyes through which the remote control means extends.

3. A decoy apparatus comprising an inclined line, a dead bird carrier movable on the line and remote control means for controlling the position of the dead bird's head and neck in the carrier, said carrier including a pair of laterally disposed swingably mounted frame members for attachment to the wings of a dead bird.

4. A decoy apparatus comprising an inclined line, a dead bird carrier movable on the line and remote control means for controlling the position of the dead bird's head and neck in the carrier, said carrier including a pair of laterally disposed swingably mounted frame members for attachment to the wings of a dead bird, and resilient contractile means between the said wing attached frame members.

5. A decoy apparatus comprising an inclined line, a dead bird carrier movable on the line and remote control means for controlling the position of the dead bird's head and neck in the carrier, said carrier including a pair of laterally disposed swingably mounted frame members for attachment to the wings of a dead bird, resilient contractile means between the said wing attached frame members, and a prop for temporarily holding the wing attached frame members in extended position.

6. A decoy apparatus comprising an inclined line, a dead bird carrier movable on the line and remote control means for controlling the position of the dead bird's head and neck in the carrier, said carrier including a pair of laterally disposed swingably mounted frame members for attachment to the wings of a dead bird, resilient contractile means between the said wing attached frame members, a prop for temporarily holding the wing attached frame members in extended position, and a stake located immediately under the first-mentioned line for displacing the prop when a decoy carrier strikes the same as the prop is traveling down the first-mentioned line.

PETER JAY PARK.